United States Patent [19]

Rachner et al.

[11] Patent Number: 4,758,118

[45] Date of Patent: Jul. 19, 1988

[54] PROCESS AND APPARATUS FOR THE METERED INTRODUCTION OF FINE-GRAIN SOLID MATERIALS INTO AN INDUSTRIAL FURNACE PARTICULARLY A BLAST FURNACE OR CUPOLA FURNACE

[76] Inventors: Hans-Günther Rachner, Berchemerweg 8, D-4300 Essen 1; Hans-Klaus Schott, Beethovenstr. 3a, D-4220 Dinslaken, both of Fed. Rep. of Germany

[21] Appl. No.: 8,985

[22] Filed: Jan. 30, 1987

[30] Foreign Application Priority Data

Feb. 1, 1986 [DE] Fed. Rep. of Germany ....... 3603078

[51] Int. Cl.⁴ ............................................ B65G 53/66

[52] U.S. Cl. .................................... 406/24; 110/106; 110/101 CC; 110/101 CF; 406/12; 406/93; 406/123

[58] Field of Search ....................... 406/12, 14, 19, 24, 406/25, 32, 93, 94, 95, 46, 123, 124, 138, 142; 110/101 CC, 101 CF, 106

[56] References Cited

U.S. PATENT DOCUMENTS

| | | | |
|---|---|---|---|
| 3,689,045 | 9/1972 | Coulter et al. | 406/24 X |
| 4,049,394 | 9/1977 | Gernhardt et al. | 406/46 X |
| 4,482,275 | 11/1984 | Shinozaki et al. | 406/24 X |
| 4,521,139 | 6/1985 | Kretschmer et al. | 406/142 X |
| 4,570,552 | 2/1986 | Rachner et al. | 110/101 CF |
| 4,582,454 | 4/1986 | Brandenburg et al. | 406/24 X |
| 4,662,798 | 5/1987 | Fassbinder | 406/19 X |

FOREIGN PATENT DOCUMENTS

| | | | |
|---|---|---|---|
| 2703736 | 8/1978 | Fed. Rep. of Germany | 406/32 |
| 2714355 | 10/1978 | Fed. Rep. of Germany | 406/25 |
| 2032597 | 5/1980 | United Kingdom . | |

*Primary Examiner*—Galen Barefoot
*Assistant Examiner*—Paul E. Salmon
*Attorney, Agent, or Firm*—Fishman, Dionne & Cantor

[57] ABSTRACT

A process and apparatus for the metered introduction of fine-grain materials, particularly pulverulent solid substances (i.e., coal dust) from a pressurized metering container which contains a supply of solid material, into an industrial furnace having a plurality of feed locations such as a blast furnace or cupola furnace is presented. The solid material is fed to the individual feed locations in a carrier gas stream through a conveying duct, the gas stream being highly charged with the solid material. The carrier gas is fed to the lower end section of the metering container in a flow which causes a local loosening in the lower section of the supply of solid material with the conveying ducts opening into the loosening region. The apparatus includes a metering container, which is designed as a pressure vessel and which is adapted to be filled at its upper end section with solid material to be fed to the furnace. The metering container includes at its lower end section a plurality of upwardly open chambers. At least one conveying duct leading to a feed location opens into each of the chambers. The conveying ducts are provided in each instance with a gas-permeable incident flow floor. Also, on the side of each conveying duct remote from the metering container a carrier gas duct for the carrier gas feed communicates therewith.

11 Claims, 1 Drawing Sheet

PROCESS AND APPARATUS FOR THE METERED INTRODUCTION OF FINE-GRAIN SOLID MATERIALS INTO AN INDUSTRIAL FURNACE PARTICULARLY A BLAST FURNACE OR CUPOLA FURNACE

BACKGROUND OF THE INVENTION

This invention relates to a process for the metered introduction of fine-grain materials, particularly pulverulent solid substances (i.e., coal dust) from a pressurized metering container which contains a supply of solid material, into an industrial furnace having a plurality of feed locations such as a blast furnace or cupola furnace. The solid material is fed to the individual feed locations in a carrier gas stream through a conveying duct, the gas stream being highly charged with the solid material. The carrier gas is fed to the lower end section of the metering container in a flow which causes a local loosening in the lower section of the supply of solid material with the conveying ducts opening into the loosening region.

The present invention further relates to an apparatus for carrying out the above-mentioned process. This apparatus includes a metering container, which is designed as a pressure vessel and which is adapted to be filled at its upper end section with solid material to be fed to the furnace. The metering container includes at its lower end section a plurality of upwardly open chambers. At least one conveying duct leading to a feed location opens into each of the chambers. The conveying ducts are provided in each instance with a gas-permeable incident flow floor. Also, on the side of each conveying duct remote from the metering container a carrier gas duct for the carrier gas feed communicates therewith.

In order to conserve high-grade fuels such as, for example, oil or coke, a portion of the fuel may be replaced by coal dust. Such coal dust is typically obtained from raw coal in a pulverizing and drying plant. The coal dust is fed to an industrial furnace by means of an appropriate pneumatic conveying device.

In this connection, the most important metallurgical requirement comprises metering of the furnace dust, that is, the quantity of coal dust fed to the furnace per unit time. This metering must take place with the greatest possible accuracy so that the metallurgical processes in the furnace are subjected to the smallest possible fluctuations.

Yet another important metallurgical requirement is that since the coal dust is not supplied at one location, but is to be fed to each tuyere, industrial furnaces (i.e., blast furnaces) generally have a plurality of feed locations presenting a further requirement that the coal dust must be fed uniformly in each instance to the individual feed locations.

Different solid materials or types of solid materials generally possess different fluid-mechanical properties under the same conditions, and accordingly show different conveying behavior, which may be determined empirically. The carrier gas flow to be fed to the chambers of the metering container below the incident flow floors must (at least) be dimensioned in such a manner (in the case of the type of solid material to be conveyed), so as to give rise to an adequate loosening of the solid material in the local loosening zone (even at the highest operating pressure occurring in the metering container). In other words, the so called loosening point of the solid substance bed present in the metering container is achieved or exceeded in any operational condition. In the case of a fine-grain solid substance, this loosening point is only insignificantly dependent upon the pressure the solid substance bed is under.

In order to solve the existing complex problems, various proposals have already been made in the literature and, in some cases, have also been already tested, at least experimentally. However, it has not yet been possible for the proposed solutions, in existence to date, to optimally satisfy the requirements to be placed on such a process and a device for carrying out the process.

Thus, for example, in German Offenlegungsschrift No. 2,934,130, it has been proposed that both the regulation of the total conveying power of solid substance to be fed to the furnace (all conveying ducts), and the regulation of the solid substance conveying powers of the individual conveying ducts, should take place by variation of the quantity of carrier gas fed to the lower end section of the metering container. This takes place by means of dust flow measuring positions which are associated with each individual conveying duct. The dust flow measuring positions act in each instance on a setting valve, which is disposed in each carrier gas feed duct. However, such regulation of the conveying power by means of the carrier gas flow does not always lead to the desired results. With regard to this technology, it should be stated, inter alia, that a quantitative measurement of the solid substance component of such two-component flows is relatively inaccurate, if the intention is that absolute values should be determined by such a measurement. It should be added that, in the case of the mode of operation proposed in German Offenlegungsschrift No. 2,943,130, a precise regulation of the conveying powers of the individual conveying ducts can be achieved only with difficulty, since the variations of the carrier gas supply which are initiated by the dust flow measuring positions can greatly alter the state of fludization of the solid substance at the start of the conveying ducts.

SUMMARY OF THE INVENTION

The above-discussed and other problems and deficiencies of the prior art are alleviated or overcome by the process and device for introducing metered amounts of solid materials into an industrial furnace of the present invention. In accordance with the present invention, a process and apparatus of the type initially described above is provided wherein, at a level of investment which is as low as possible, an accurate, operationally reliable, rugged and predetermined metering (largely independent of the necessarily fluctuating respective properties of the solid substance) of the total quantity of solid substance which is fed to the furnace can be achieved. The total quantity of the solid material intended to be fed substantially uniformly to the individual feed locations of the furnace; and a regulating range which is as wide as possible for the respective solid substance conveying power intended to be present in the individual conveying ducts can also be achieved. Moreover, the present invention provides the wear of the conveying ducts to be as small as possible; or at least to be restricted to a small section.

In accordance with the process of the present invention, a metering container containing a supply of solid substance is continuously weighed. Next, the actual weight of the metering container (together with its contents) is compared with its theoretical weight obtained from the initial weight, the theoretical output power and the time which has elapsed since the commencement of output. Then, the pressure in the metering container is increased or reduced in the event the weight either exceeds or falls below the theoretical weight. Thereafter, regulation of the conveying power of each conveying duct takes place, in a manner known per se, by the addition of secondary gas, the secondary gas being fed to the conveying ducts in each instance adjacent the pertinent feed location upstream to a throttling position.

Using the above-described process of the present invention, as a result of the gravimetric metering of the total quantity of solid substance fed to the furnace per unit time and the regulation thereof by means of the pressure difference between the pressure in the metering container and the furnace or the end of the conveying ducts, a degree of accuracy is achieved which is extremely high within the limits of the set requirements. This accuracy is typically so great that the pressure (regulating the total output power) in the metering container, is varied only at time intervals on the order of magnitude of 5–10 min. Moreover, this degree of accuracy may be achieved with a relatively low amount of expenditure. In this connection, the regulation of the differential pressure preferably takes place, in a manner known per se, by the supply or withdrawal of pressurized top gas, which is fed through the metering container of the supply of solid substance. The quantity of top gas fed is preferably selected in such a manner that not only is the quantity of solid substance discharged in each instance from the metering container replaced by top gas and gap volume (corresponding to the respective operating pressure) between the solid substance components filled out by gas, but also, in all cases a part of the fed top gas flows into the local loosening region and is discharged together with the solid substance as well as the carrier gas fed to the metering vessel at the lower end section, through the conveying ducts. This latter feature has proved to be extremely expedient in order to assure a constant subsequent flow of solid substance into the chambers as well as for the desired high degree of charging with solid substance.

In contrast to the above-described, previously known process of the German patent, the quantity of carrier gas (related to the normal condition) fed as a function of time to the lower end section of the metering vessel is, in the case of the process according to the present invention, preferably kept constant for a specified type of solid substance. The quantity of carrier gas is selected in such a manner that, in the case of the type of solid substance concerned, under the greatest operating pressure occurring in the metering container, it still leads to a loosening of the solid substance in the local loosening zone.

The apparatus of the present invention comprises a metering container which is designed, in a manner known per se, as a weighing vessel. The upper end section of the vessel has a top gas duct, provided with a regulating valve, for feeding top gas under excess pressure. A first regulating device is provided, by means of which the actual weight of the metering container (together with its contents) is compared after specified time intervals, with its theoretical weight and the pressure in the metering container is increased or decreased by regulation of the top gas pressure in the event the weight exceeds or falls below the theoretical weight. The pressure is kept constant in the event of agreement between the theoretical weight and the actual weight.

The cross-section of the conveying ducts is substantially reduced in each instance in that section disposed upstream, directly in front of the pertinent feed location. A bypass duct guiding secondary gas opens into each conveying duct upstream adjacent the cross-sectional constriction. Each conveying duct is provided with a measuring device by means of which the relative actual conveying power of the pertinent conveying duct is to be determined. A mean value former is provided by means of which the mean conveying power for each conveying duct is determined. Also, in each conveying duct, a second regulating device is provided, by means of which the quantity of secondary gas fed to the conveying duct is to be increased or decreased if the actual conveying power of the conveying duct (as determined by the measuring device) is greater or smaller, respectively than the mean conveying power of each conveying duct as determined by the means value former.

In addition to the above-described gravimetric metering of the total quantity of solid substance fed to the furnace, and regulation thereof by means of the differential pressure between the pressure in the metering container and in the furnace or at the end of the conveying ducts, a further important feature of the present invention comprises the cross-sectional constriction of the conveying ducts at their end section and the supply of secondary gas to the conveying ducts more or less directly adjacent the cross-sectional constriction of the conveying ducts. At the position of the constriction, (by reason of the pressure drop in the conveying ducts), a considerable pressure difference exits with respect to the pressure in the metering container. This pressure drop also exists by reason of the throttling associated with the cross-sectional constriction, with respect to the pressure in the furnace, so that with the bypass ducts guiding secondary gas, a relatively large quantity of gas is introduced into the conveying ducts and accordingly, a relatively large regulating range for the quantity of solid substance flowing out of the individual conveying ducts into the furnace is created. This is because secondary gas introduced into a conveying duct correspondingly dilutes the two-component mixture and accordingly less solid substance flows in per unit time in the event of a greater addition of secondary gas to the furnace from the pertinent duct.

In addition, the large cross-sectional constriction at the end of the conveying ducts gives the further important advantage that in the unconstricted part of the conveying ducts, the length of which can amount to 100 to 200 meters, operation can take place at a relatively low conveying speed of, for example, 0.8 to 3 m/sec., which causes a correspondingly low degree of wear. Meanwhile, the flow velocity in the constricted portion is relatively high (for example, 18 to 30 m/sec.) and greater wear (relative to the unconstricted portion) takes place only in this short section of the conveying duct; it being possible for those short sections to be exchanged after an appropriate degree of wear.

The cross-sectional constriction in the conveying ducts preferably takes place steadily (as opposed to an abrupt constriction). A conically or similarly constructed intermediate section may be provided between the section of the conveying duct having the larger cross-section and its section having the smaller cross-section.

In accordance with the present invention, the cross-sectional ratio between the unconstricted and the constricted part of a conveying duct is equal to approximately 10:1–25:1. Preferably, the unconstricted cross-section of the conveying ducts has a diameter of approximately 35 to 40 mm, while the constricted cross-section possesses a diameter of 6 to 8 mm.

The weight-measuring devices which are provided for the measurements of the weight of the metering container, together with its contents, are preferably electrical load cells on which the metering vessel is supported. The measurement signals of these load cells are to be fed to the first regulating device. Such load cells are not only extremely rugged and relatively inexpensive, but also possess, within the limits of the above-described conditions, a degree of accuracy which is sufficient for the gravimetric metering.

The measuring devices for the determination of the relative actual conveying power in the conveying ducts do not need to be extremely expensive measuring devices of the type which measure the throughput quantity in the conveying ducts with relatively great accuracy, since, only a relative measurement of the conveying power in the individual conveying ducts relative to one another needs to take place. This is because, with these measuring devices, in contrast to previously known devices, such as the above-described device of German Pat. No. 2,934,130, it is not necessary to measure any absolute values. Preferably, these measuring devices are capacitively operating measuring devices, impairments of the measurement resulting from variation in the humidity etc. not playing any part in the case of this relative measurement, since the properties of the material to be conveyed are substantially the same in the individual conveying ducts at the same point in time.

The above-described and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figures 1, 2:
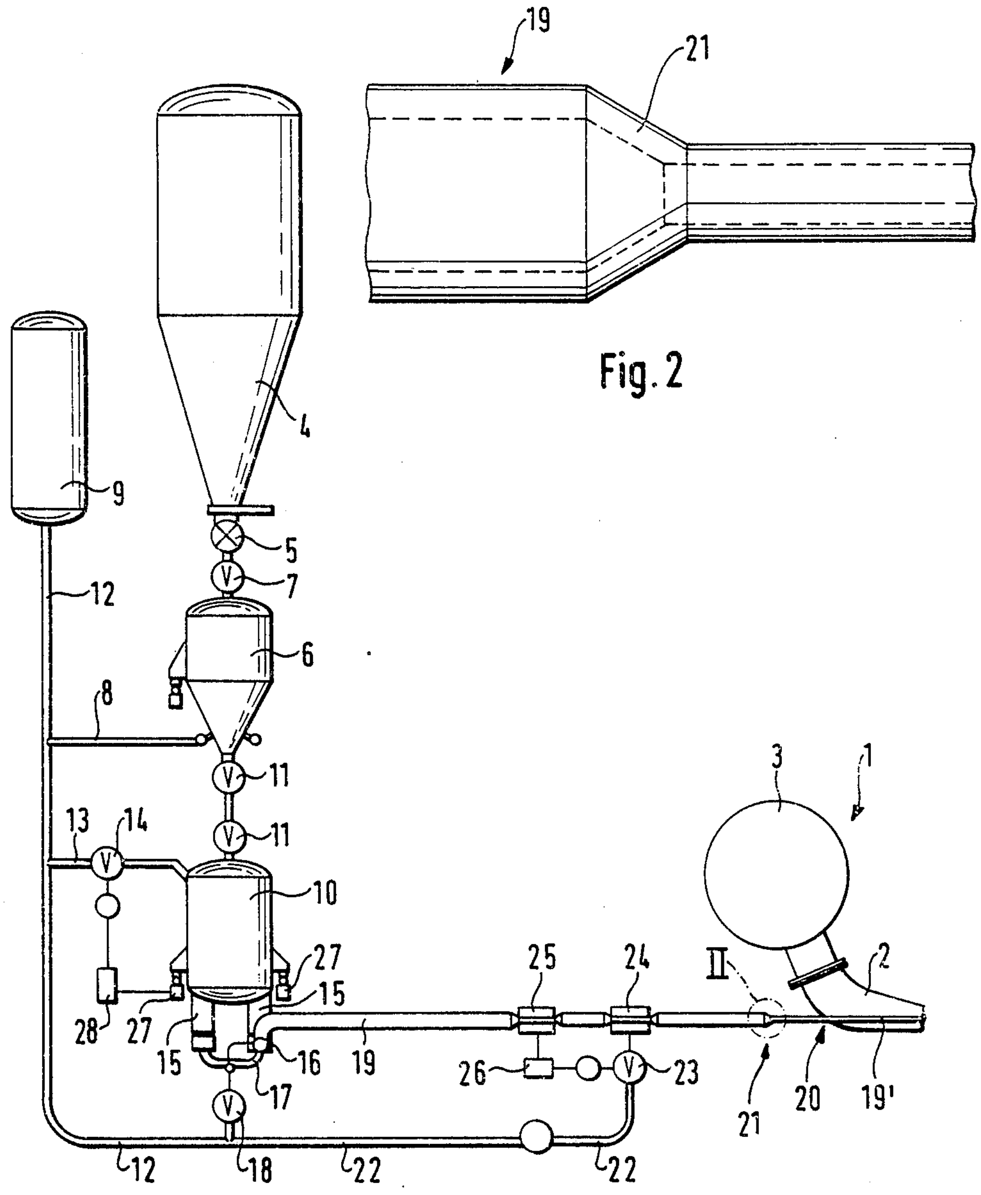
FIG. 1 is a simplified diagrammatic representation of an apparatus in accordance with the present invention.
FIG. 2 is a cross-sectional elevation view of a constriction in a conveying duct used in accordance with the present invention.

FIG. 1 is a highly diagrammatic and simplified representation of an apparatus in accordance with the present invention for the metered introduction of coal dust into a blast furnace. A plurality of tuyeres, one of which is identified at 2 are distributed about the periphery of the blast furnace (identified by the numeral 1) in a known manner, the tuyeres communicating with an annular wind tunnel 3.

The coal dust to be blown into blast furnace 1 is fed, after production thereof in a pulverizing and drying plant, into a storage silo 4. Silo 4 is under an inert atmosphere and is adapted for storing a quantity of coal which is sufficiently large to bridge any possible breakdown of production from the pulverizing and drying plant lasting for several hours. From storage silo 4, the pulverized coal passes via a bucket wheel gate 5 into a gate vessel 6, which, after filling, is to be closed by means of a valve 7 in relation to storage silo 4. Thereafter, gate vessel 6 is acted upon at its lower end section via a duct 8 with gate gas originating from a blast box 9, until the prescribed operating pressure of a metering container 10 (which is disposed below gate vessel 6 and which is likewise constructed as a pressure vessel) is achieved. Next, the coal dust situated in gate vessel 6 passes into metering container 10 after opening of valves 11. After the filling of metering container 10, valves 11 are closed again.

The gas duct 12 leading from blast box 9 to duct 8 for the gate gas is continued via the connecting position of duct 8 and is connected to a top gas duct 13, which leads to the upper section of metering container 10. Duct 13 has a regulating valve 14 disposed therein.

At the lower end of metering container 10, a plurality of chambers 15 are disposed which are open upwardly (i.e., into the metering container 10) and the maximum number of which corresponds to the number of tuyeres 2 of the blast furnace 1 which are to be charged with coal dust. Each chamber 15 is provided, in its lower region, with a gas-permeable incident flow floor 16. In each instance, a carrier gas duct 17 opens into each chamber 15 (preferably via pot shaped extensions) below the incident flow floors 16, where the coal dust is loosened or fluidized by the carrier gas which has been introduced.

From each chamber 15 leads a conveying duct 19. The conveying ducts 19 (of which only one is shown for better clarity) communicate with chambers 15 somewhat above the incident flow floor 16, where the coal dust is loosened or fluidized by the carrier gas which has been introduced.

The conveying ducts 19, the length of which amounts to between 100 and 200 meters, have a free cross-section of 25 mm substantially over their entire length. The cross-section of conveying ducts 19 is reduced in each instance downstream in relation to the pertinent feed location identified at 20 and adjacent the latter to a substantial extent, to a diameter of about 6 mm. As can be seen from FIG. 2, this considerable cross-sectional reduction does not take place abruptly or suddenly, but substantially evenly or gradually by means of a conical intermediate piece 21.

Gas duct 12 coming from blast box 9 is continued via the connecting position of the carrier gas ducts 17, by a bypass duct 22. As a result, secondary gas is conducted into the pertinent conveying duct 19 via duct 22. In each bypass duct 22, there is disposed a regulating valve 23, by which the quantity of secondary gas fed to the pertinent conveying duct 19 is to be regulated.

In front of the connecting position 24 for bypass duct 22 is disposed a capacitive measuring device 25. Measuring device 25 is upstream in each conveying duct 19 and permits the relative conveying power of the pertinent conveying duct 19 to be determined. Measuring devices 25 pass their measurement values, in each instance, to a regulating device 26, which includes, inter alia, a calculator. By means of device 26, regulating valves 23 in the bypass ducts 22 are regulated.

Metering container 10 is supported on load cells 27, by means of which its weight (together with its contents) is to be continuously measured. The measured values are fed to a regulating device 28, which is, in addition, connected to regulating valve 14 of top gas duct 13.

Since the filling of metering container 10 is of no particular interest in the context of the present invention, beyond the remarks which have already been made above, the description, which follows, of the mode of operation of the device is restricted to the operating sequence after the filling of metering container 10 has been completed.

Depending upon the respective conveying properties of the coal dust and the operationally prescribed conveying power, the required operating pressure in metering container 10 is set by means of top gas duct 13. In this regard, the differential pressure between the pressure in metering container 10 and the pressure prevailing in the blast furnace or the pressure prevailing at the end of conveying ducts 19 is, in principle, kept constant during the emptying of metering container 10.

The actual weight of metering container 10 (together with its contents) is constantly compared by regulating device 28 with the theoretical weight of the metering container 10 (i.e., with that weight which the metering container should have after the time which has elapsed since the commencement of emptying, having regard to the prescribed output power). If, in this procedure, the actual weight of metering container 10 corresponds to its theoretical weight, then this indicates that in the pertinent time interval, the prescribed output quantity has also actually been discharged and fed to blast furnace 1, so that the operating conditions are not altered.

If the actual weight of metering container 10 is greater than its theoretical weight at the pertinent point in time, then this means that too little coal dust has been discharged from metering container 10. In such a case, regulating device 28 causes the pressure (previously kept constant) in metering container 10 to be increased. This is accomplished by regulating device 28 appropriately acting on regulating valve 14 of top gas duct 13.

If at the point in time when the measurement is made, the actual weight is smaller than the theoretical weight of metering container 10, and accordingly too much coal dust has been discharged from the metering container, then regulating device 28 brings about a reduction in the pressure (previously constant) in metering container 10 and thus a corresponding reduction in the output power.

In this way, it can be assured, with relatively simple, rugged and operationally reliable means, that the prescribed quantity of coal dust per unit time is also actually fed to the blast furnace 1, within the limits of the required accuracy.

During the charging of blast furnace 1 with coal dust, the quantity of carrier gas fed via carrier gas ducts 17 to metering container 10 via chambers 15 thereof is kept constant. As a result, the conditions which are determined on or prior to commencement of operation, and which are adapted to the respective properties of the coal dust and coordinated with the prescribed thoughput power, remain substantially unchanged. Indeed, this is applicable, as is evident, in an advantageous manner also for the fludization conditions at the start of conveying ducts 19.

Since now, however, as has been stated above, a further operational requirement is that the coal dust should also be, to a large extent, uniformly fed to individual feed locations 20 of blast furnace 1, there takes place during the discharge an appropriate relative regulation of the conveying powers of the individual conveying ducts 19. To this end, the solid substance throughput powers determined by the capacitive measuring devices 25 of the conveying ducts 19 are fed to measuring device 25 in the form of signals and, in a mean value former of regulating device 26, a mathematical mean value of the conveying power is determined for each conveying duct 19. If, in this procedure, regulating device 26 established that the measured conveying power of a specified conveying duct 19 is greater than the determined mean value and thus is to be reduced for the purpose of creating uniformity, then regulating device 26 acts on regulating valve 23 of the pertinent bypass duct 22 in such a manner that the secondary gas fed to the pertinently conveying duct 19 at connecting position 24 is increased in terms of quantity. As a result, a corresponding dilution of the two-component flow and thus a reduction in the output power of the pertinent conveying duct 19 with regard to solid substance (coal dust) take place. On the other hand, if the conveying power determined in a conveying duct 19 is smaller than the means value, then the reverse process takes place, i.e., the secondary gas flow fed to the conveying duct 19 is appropriately reduced.

Since the connecting positions 24 of bypass ducts 22 are disposed in each instance adjacent the constriction location 21, there is indeed, on account of the pressure drop during conveying in conveying duct 19 in relation to the metering container 10, as well as the cross-sectional constriction in relation to the blast furnace 1, a considerable pressure gradient, so that it is possible to achieve a large regulating range in order of magnitude of 1:3 to 1:4 in the individual conveying ducts 19.

In spite of the high degree of charging with solid substance which is dependent upon the properties of the coal, the duct dimensions etc., and depending on the counter-pressure in the industrial furnace, the coal to gas ratio is in the range of from 20:1 to more than 1 00:1 kg coal/kg gas, and the wear on the conveying ducts 19 is extremely small. This is because under usual conditions, it is possible to operate with conveying speeds in the range of approximately 0.8 to 3 m/sec. and only in the region of the lance-shaped constricted section 19' are speeds in the range of 18 to 30 m/sec. reached. However, these high speeds are not to be regarded as a negative subsidiary effect of the cross-sectional constriction of the conveying ducts 19, but are necessary, having regard to the high wind speeds in the wind tunnel 3 or in the tuyeres 2 and to the internal pressure prevailing in the furnace, in order to be able to blow in the two-component flow into the blast furnace. Thus, the relatively small diameter, which is present as a result of the cross-sectional construction, at the constricted end section 19' of the conveying ducts 19 proves to be advantageous also on introduction into blast furnace 1, since with such dimensions, introduction by hand is still possible, even at the high internal pressures of the blast furnace.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for metered introduction of granular solid substances from a metering container into a furnace comprising:

a metering container having an upper end section and a lower end section, said metering container defining a pressure vessel which is adapted to be filled with solid substance at said upper end section, said metering container having a plurality of upwardly open chambers communicating with said lower end section;

at least one conveying duct communicating with each of said chambers and leading to a plurality of feed locations for feeding the furnace;

a gas-permeable incident flow floor provided in each chamber on the side thereof remote from said metering container, said gas-permeable incident flow floor having attached thereto a carrier gas duct for the supply of carrier gas;

weighing means associated with said metering container;

a top gas duct connected to said upper end section of said metering container, said top gas duct being provided with a regulating valve for feeding top gas under excess pressure;

first regulating means for comparing the actual weight of said metering container, after specified time intervals, with its theroretical weight, and for increasing or decreasing the pressure in the metering container by regulation of the top gas pressure in the event of the actual weight exceeding or falling below the theoretical weight, respectively, and wherein the pressure in said metering container is kept constant in the event of agreement between the theoretical weight and the actual weight;

said conveying ducts having a cross-section which is substantially reduced defining a constriction in an area disposed upstream of a selected feed location, the cross-sectional ratio on opposed ends of said constriction being about 10:1 to about 25:1;

bypass duct means for guiding secondary gas into each conveying duct, said bypass duct means being upstream of said constriction;

measuring means associated with each of said conveying ducts for determining the actual conveying power of each conveying duct;

mean value former means for determining the mean conveying power for each conveying duct; and second regulating means associated with each of said conveying ducts for increasing or decreasing the quantity of secondary gas fed to the conveying duct if the actual conveying power of the conveying duct, as determined by said measuring means is greater or smaller, respectively, than the mean conveying power of each of said conveying ducts as determined by said mean value former means.

2. The apparatus of claim 1 wherein:

said metering container is supported on electrical load cells, the measurement signals of which are fed to said first regulating means.

3. The apparatus of claim 1 wherein:

said constriction in said conveying ducts is substantially gradual.

4. The apparatus of claim 3 wherein said gradual constriction comprises:

a conical intermediate section in each of said conveying ducts.

5. The apparatus of claim 1 wherein:

the diameter of the conveying ducts is reduced from about 25 to 40 mm prior to said construction to about 6 to 8 mm subsequent to said constriction.

6. The apparatus of claim 1 wherein:

said measuring means for the determination of the actual conveying power in said conveying ducts are capacitive measuring means.

7. An apparatus for metered introduction of granular solid substances from a metering container into a furnace comprising:

a metering container having an upper end section and a lower end section, said metering container defining a pressure vessel which is adapted to be filled with solid substance at said upper end section, said metering container having a plurality of upwardly open chambers communicating with said lower end section;

at least one conveying duct communicating with each of said chambers and leading to a plurality of feed locations for feeding the furnace;

a gas-permeable incident flow floor provided in each chamber on the side thereof remote from said metering container, said gas permeable incident flow floor having attached thereto a carrier gas duct for the supply of carrier gas;

weighing means associated with said metering container;

a top gas duct connected to said upper end section of said metering container, said top gas duct being provided with a regulating valve for feeding top gas under excess pressure;

first regulating means for comparing the actual weight of said metering container, after specified time intervals, with its theoretical weight, and for increasing or decreasing the pressure in the metering container by regulation of the top gas pressure in the event of the actual weight exceeding or falling below the theoretical weight, respectively, and wherein the pressure in said metering container is kept constant in the event of agreement between the theoretical weight and the actual weight;

said conveying ducts having a cross-section which is substantially reduced defining a constriction in an area disposed upsteam of a selected feed location wherein the diameter of the conveying ducts is reduced from about 25 to 40 mm prior to said constriction to about 6 to 8 mm subsequent to said constriction;

bypass duct means for guiding secondary gas into each conveying duct, said bypass duct means being upstream of said constriction;

measuring means associated with each of said conveying ducts for determining the actual conveying power of each conveying duct;

mean value former means for determining the mean conveying power for each conveying duct; and second regulating means associated with each of said conveying ducts for increasing or decreasing the quantity of secondary gas fed to the conveying duct if the actual conveying power of the conveying duct, as determined by said measuring means is greater or smaller, respectively, than the mean conveying power of each of said conveying ducts as determined by said mean value former means.

8. The apparatus of claim 7 wherein:

said metering container is supported on electrical load cells, the measurement signals of which are fed to said first regulating means.

9. The apparatus of claim 7 wherein:

said constriction in said conveying ducts is substantially gradual.

10. The apparatus of claim 9 wherein said gradual constriction comprises:

a conical intermediate section in each of said conveying ducts.

11. The apparatus of claim 7 wherein:

said measuring means for the determination of the actual conveying power in said conveying ducts are capacitive measuring means.

* * * * *